Feb. 5, 1924.
J. J. ARMSTRONG
1,482,722
HOSE COUPLING
Filed Jan. 21, 1922
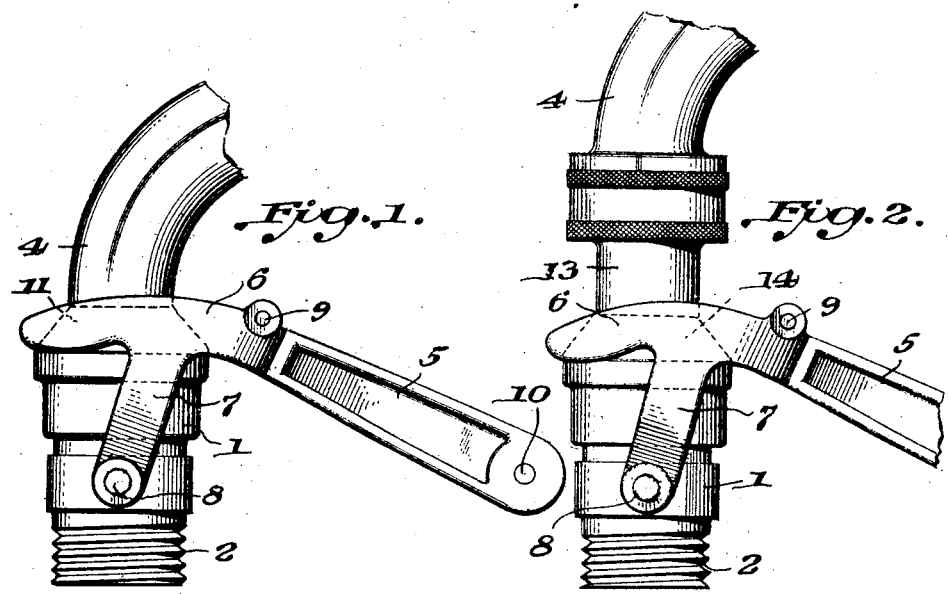
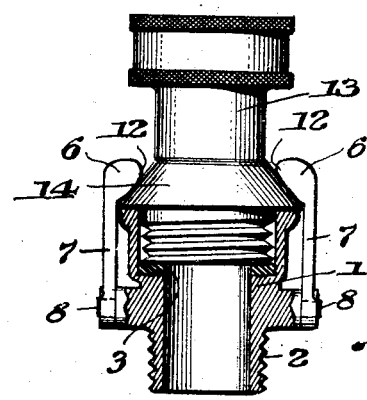
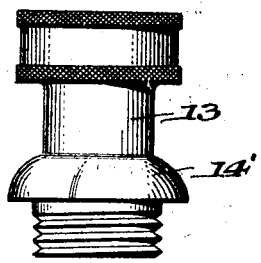
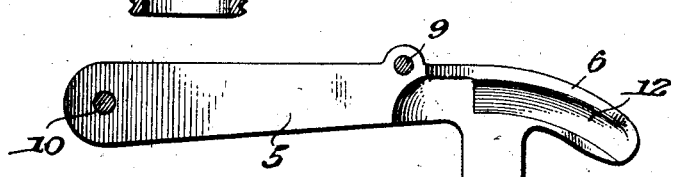
Inventor;
John J. Armstrong
By Chas. J. O'Neill
Atty.

Patented Feb. 5, 1924.

1,482,722

UNITED STATES PATENT OFFICE.

JOHN JAMES ARMSTRONG, OF LOS ANGELES, CALIFORNIA, ASSIGNOR OF ONE-HALF TO ROBERT B. BOOTH, OF HONOLULU, TERRITORY OF HAWAII.

HOSE COUPLING.

Application filed January 21, 1922. Serial No. 530,906.

*To all whom it may concern:*

Be it known that I, JOHN J. ARMSTRONG, a citizen of the United States, residing at Los Angeles, California, have invented certain new and useful Improvements in Hose Couplings; and I do hereby declare the following to be a full, clear, and exact description of the invention, such as will enable others skilled in the art to which it appertains to make and use the same.

This invention relates to a quick detachable hose coupler or the like and particularly to certain improvements over the constructions as disclosed in my co-pending application, Serial No. 367,755, and the patent to Robert B. Booth, 1,304,653.

The principal object of the present invention is the provision of a device of the character indicated wherein a cam lever is adapted to cooperate with complementary cam surfaces formed on the discharge end of a faucet or on an adapter when the faucet is not constructed with the necessary cambered end, said adapter in this latter instance being provided with the required lever engaging cam surface.

Another object of the invention is to provide a hose coupler whereby a hose or the like can be expeditiously and securely clamped to the discharge end of a faucet from any side, or radiating angle of the faucet the application thereof involving the drawing together of said parts by the said cam and lever action.

A further object is to simplify the construction of this class of devices whereby the desired manipulation may be accomplished with the minimum number of parts, adding greatly to the efficiency in operation, practicability, and economy in production.

The invention also contemplates as an alternative arrangement as hereinbefore stated, the use of a specially designed adapter in cases where the lower end of the faucet is not well suited to the functioning of the device. It is to be observed that the lever, as a whole, comprises a main or handle part and a bifurcated or forked part in approximately linear extension of the main part, together with angularly disposed arms that are pivoted at their extremities to opposite sides of the socket member 1. The lever so constructed provides a very efficient means for operating the cams, hereinafter described, in a coupling operation.

The preferred embodiment of the invention is illustrated in the accompanying drawings in which Fig. 1 is a view in side elevation of the device as applied to a faucet provided with the necessary cambered end.

Figure 2 is a similar view illustrating the use of a specially designed adapter where the faucet is not suited to the direct application of the coupler thereto.

Figure 3 is a view illustrating the cam action between the cambered end of the spigot or adapter and the arcuate cams carried by the clamping lever.

Figure 4 is a modified form of adapter and

Figure 5 illustrates one of the half sections forming the clamping lever, the arcuate cam being clearly shown.

Referring to the drawings in detail the improved device comprises a socket member 1 having its lower end provided with screw threads 2 for receiving a hose or the like and an annular recessed upper portion 3 adapted to receive the lower end of a faucet or the like 4.

Pivotally carried by the socket member 1 is a two part lever 5 each section thereof being provided with a curved inner end or leg 6 and a downwardly projecting extension or leg 7, the lower end of said leg 7 of each section forming a bearing for the pivot 8 carried by the socket 1 by which means said lever 5 is pivotally mounted on said socket member 1.

The two matched sections or component parts of the lever 5 are secured together by screws, rivets, or the like 9 and 10 to form substantially a unitary structure having a forked inner end formed by the curved portions 6, straddling the socket member 1, as clearly illustrated in the drawings.

In using the coupler in connection with a faucet suitably constructed said faucet will be provided with a frusto-conical lower end portion 11 forming an annular outwardly flared cam surface adapted to cooperate with arcuate eccentrically positioned cams 12 formed on the inner faces of the complementary curved extension 6 of the lever 5. These arcuate cams are coextensive with the curved extensions 6 and their faces are transversely inclined.

In order that the device will function in connection with faucets of the ordinary type an adapter 13 is provided said adapter having formed on its lower end an annular cammed surface 14 similar to that just described with respect to the specially designed faucet.

Referring to Figures 1 and 3 it will be noted that the forked end of the lever will straddle the cambered surface 12 or 14 of either the faucet 4 or adapter 13, the eccentric cams 12 of said forked extension engaging the outwardly flared frusto-conical end of the faucet or adapter and upon a continued upward movement of the lever 5 the desired clamping of the various parts will be effected. The transversely inclined faces of the cams provide an extended contact with the inclined face of the frusto-conical end of the faucet or adapter. This extended mutual contact of the two faces facilitates the camming action.

It will be here noted that this clamping action will not be dependent entirely upon the eccentrically formed cams 12 carried by the forked end of the lever 5 but in addition this action is augmented by reason of its cooperation with the cambered end of the faucet or adapter. As the lever 5 is raised to perform the clamping action, by reason of the eccentric arcuate cams 12 with their transversely inclined faces, said cams will have a tendency theoretically to force themselves down the sloping or cambered surface 11 or 14 of either the faucet or adapter according to which construction is used. Owing to this tendency and the fact that the forked extension of the lever can not in reality be forced down the sloping cambered surface by reason of its rigid construction, obviously the said cambered surface of the faucet or adapter will be in effect pulled downwardly, or rather conversely, in reality in the practical operation of the device the socket member 1 will be drawn upwardly producing the desired clamping action in a novel and efficient manner.

In the modification as illustrated in Figure 4 the adapter or faucet may be provided with a frusto-spherical cambered end 14' in lieu of the frusto-conical flange or cambered surface hereinbefore described.

With the above described construction all complicated and delicate parts have been eliminated producing a more rigid and substantial device and, furthermore said device may be applied to the faucet from any angle or side thereof which will greatly simplify and facilitate the operation of the coupler.

What I claim is:

1. In a hose coupler for faucets, the combination with a faucet discharge element provided with an annular camber adjacent to its end, of a socket member to receive the cambered end of the faucet discharge element and provided with a hose connection, and a lever pivoted transversely of said socket member and comprising a main part and opposite cam members in approximately linear extension of said main part, said cam members being operative by the lever to engage the annular camber on opposite sides of the faucet discharge element seated in the socket member.

2. In a hose coupler for faucets, the combination with a faucet discharge element provided with an annular camber adjacent to its end, of a socket member to receive the cambered end of the faucet discharge element and provided with a hose connection, and a lever pivoted transversely of said socket member and comprising a main part and a bifurcated part in approximately linear extension of said main part, and cams on the inner faces of the bifurcation members and operative by the lever to engage the annular camber on opposite sides of the faucet discharge element seated in the socket member.

3. In a hose coupler for faucets, the combination with a faucet discharge element provided with an annular camber adjacent to its end, of a socket member to receive the cambered end of the faucet discharge element and provided with a hose connection, a lever comprising a main part and a bifurcated part in approximately linear extension of the main part together with arms angularly extending from the lever and pivoted at their extremities to opposite sides of the socket member, and cams on the inner faces of the bifurcation members to be operated by the lever to engage the annular camber on opposite sides of the faucet discharge element seated in the socket member.

4. In a hose coupler for faucets, the combination with a faucet discharge element provided with an annular camber adjacent to its end, of a socket member to receive the cambered end of the faucet discharge element and provided with a hose connection, a lever comprising a main part and a bifurcated part in approximately linear extension of the main part together with arms angularly extending from the inner ends of the members of the bifurcation and pivoted at their extremities to opposite sides of the socket member, and arcuate cams projecting from the inner faces of the bifurcation members to be operated by the lever to engage the annular camber on opposite sides of the faucet discharge element seated in the socket member.

5. In a hose coupler for faucets, the combination with a faucet discharge element provided with an annular camber adjacent to its end, of a socket member to receive the cambered end of the faucet discharge element and provided with a hose connection, a lever comprising a main part and a bifurcated part in approximately linear extension of the main part together with arms angularly extending from the inner ends of the members of the bifurcation and pivoted at their extremities to opposite sides of the socket member, and elongated arcuate cams projecting from the inner faces of the bifurcation members eccentric to the pivotal connection of the angularly disposed arms with the socket member, said cams being operative by the lever to engage the annular camber on opposite sides of the faucet discharge element seated in the socket member.

6. In a hose coupler for faucets, the combination with a faucet, of an adapter to be secured on the discharge end of the faucet and provided with an annular camber adjacent to the discharge end of said adapter, of a socket member to receive the cambered end of the adapter and provided with a hose connection, and a lever pivoted transversely of said socket member and comprising a main part and opposite cam members in approximately linear extension of said main part, said cam members being operative by the lever to engage the annular camber on opposite sides of the adapter seated in the socket member.

In testimony whereof I affix my signature.

JOHN JAMES ARMSTRONG.